Oct. 23, 1923.

C. A. CLARK 1,471,591

TIRE CHANGER

Filed Feb. 8, 1922  2 Sheets-Sheet 2

Inventor
CHESTER ALVIN CLARK

By Harry C. Schroeder
Attorney

Patented Oct. 23, 1923.

1,471,591

UNITED STATES PATENT OFFICE.

CHESTER ALVIN CLARK, OF OAKLAND, CALIFORNIA.

TIRE CHANGER.

Application filed February 8, 1922. Serial No. 535,101.

*To all whom it may concern:*

Be it known that I, CHESTER ALVIN CLARK, a citizen of the United States, residing at Oakland, in the county of Alameda and State of California, have invented certain new and useful Improvements in Tire Changers, of which the following is a specification.

My invention is a tire changer, particularly useful in garages, which may be efficiently operated with a small amount of manual force.

Referring to the annexed drawings in which my invention is illustrated and which forms a part of this specification:

Figure 1:
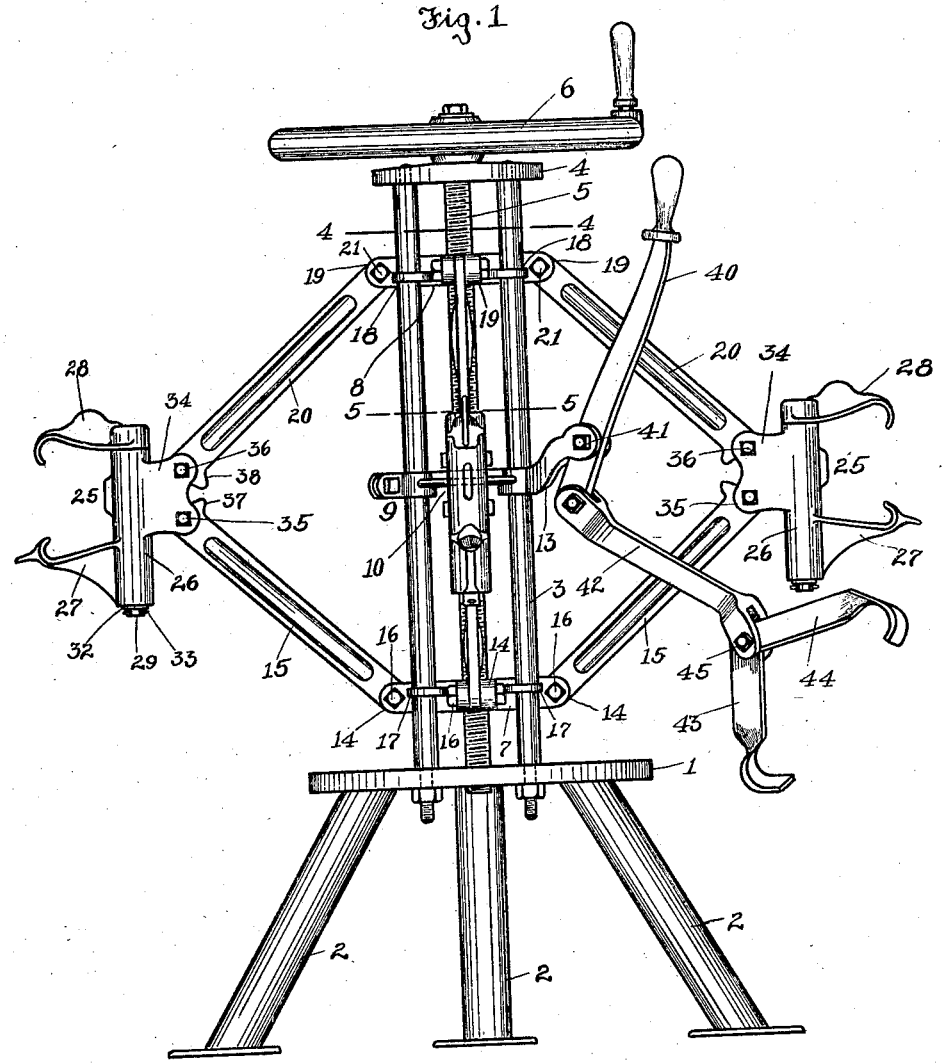
Figure 1 is an elevation of my tire changer.
Figure 2:
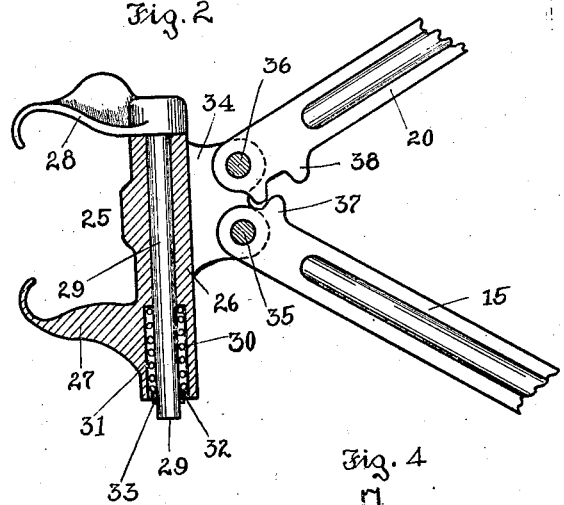
Figure 2 is a fragmentary side view showing a pair of the rim grip arms and the grip in vertical section carried by said arms.
Figure 3:
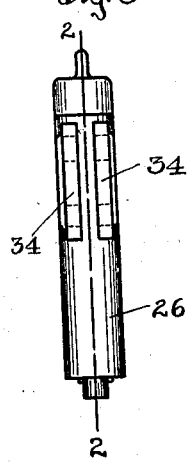
Figure 3 is a rear elevation of one of the rim grips.
Figure 4:
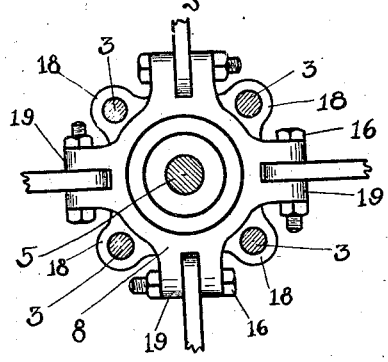
Figure 4 is a fragmentary horizontal section of my tire changer taken on line 4—4 of Figure 1, showing the upper nut to which the upper rim grip arms are pivotally connected.
Figure 5:
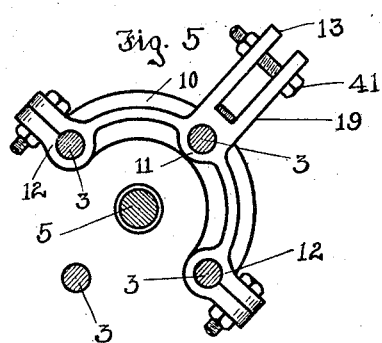
Figure 5 is a fragmentary horizontal section of my tire changer taken on line 5—5 of Figure 1 showing the frame on which the rim joint grip lever is fulcrumed.

In the drawing 1 indicates a circular base mounted on legs 2. Vertical parallel standards 3 are secured at their lower ends concentrically equi-distant apart to the disk 1 and at their upper ends to a head 4. A vertical screw 5 is journaled at its lower end centrally in the base 1 and at its upper end centrally in the head 4, and a hand wheel 6 is secured on the upper end of said screw above said head for rotating the screw. Nuts 7 and 8 screw on the screw 5 between the base 1 and the head 4, the nut 8 being above the nut 7. A frame 10 is clamped on two of the standards 3, said frame including a bearing 11 midway between the ends of said frame through which one of the rods 3 extends, and two clamps 12 on the ends of said frame, respectively, through which clamps extend two standards 3, on which standards said clamps are clamped to secure the frame 10 on the standards 3 at any desired elevation. A pair of outwardly extending ears 13 are formed on the frame 10 at the bearing 11. On the nut 7 are formed four pairs of radial ears 14 spaced at 90° apart, in each of which pair of ears is pivoted the lower end of an arm 15 by means of a bolt 16. Ears 17 are formed on the nut 7 through which ears extend the standards 3 for preventing said nut from turning on the screw. Ears 18 are formed on the nut 8 through which extend the standards 3 for preventing said nut from turning on the screw. On said nut are formed four pairs of radial ears 19 spaced 90° apart, in each of which pair of ears is pivoted the upper end of an arm 20 by means of a bolt 21. Rim grips 25, each comprise a vertical elongated bearing 26, a lower fixed jaw 27 and an upper movable jaw 28 which is secured to the upper end of a rod 29 slidable in said bearing, said movable jaw being normally held in its lowermost position against the upper end of said bearing by a spring 30 surrounding the lower end of rod 29 in a recess 31 in the lower end of said bearing and bearing at its upper end against the upper end of said recess and at its lower end against a collar 32 on the lower end of said rod, which collar is held on the rod by a cotter pin 33 upon which the collar rests. Each rim grip 25 is mounted on the upper end of an arm 15 and the lower end of an arm 20, said arms being respectively pivoted at their upper and lower ends between a pair of ears 34 on the rear of the grip bearing 29 by pivot bolts 35 and 36. Intermeshing gear teeth 37 and 38 are formed on each pair of arms 15 and 20 which are connected to a rim grip 25 to maintain the bearing 29 of the grip in vertical position. A lever 40 is fulcrumed between the ears 13 by a pivot bolt 41. A link 42 is pivotally connected at one end to the lower end of lever 41. A pair of jaws 43 and 44 are pivoted in the other end of said link by a pivot bolt 45.

To remove a tire from a rim, the rim is placed in the grips 25 and held by the flanges by the jaws 27 and 28, the grips being adjusted to the diameter of the rim by rotating the screw which moves the nuts 7 and 8 up or down and the grips outwardly or inwardly. The jaws 43 and 44 are applied to the rim at the joint. The lever 40 is swung outwardly which breaks the joint of the rim and the screw 5 is rotated by the hand wheel 6 to move the nuts 7 and 8 away from each other and the grips 25 inwardly which contracts the rim so that the tire falls off the rim.

To place the tire on the rim, the rim is first contracted as above described; the tire is then slipped over the rim and the screw 5 rotated to force the grips outwardly and the rim flanges over the beads of the tire while the lever 40 is swung inwardly to set the joint of the rim.

Having described my invention, I claim:

1. A tire changer including a base, standards upstanding from said base, a head secured to the upper ends of said standards, a screw journaled at its lower end in said base and at its upper end in said head, two nuts on said screw, arms pivoted at one end to one of said nuts, rim grips, each arm being pivoted at its other end of one of said grips, arms pivoted at one end to the other nut and at their other end to said grips respectively, ears on said nuts through which said standards extend, and means for engaging the rim at the joint for breaking or setting the joint.

2. A tire changer including a plurality of grips for gripping the tire rim, toggle means for forcing said grips horizontally inwardly or outwardly, means for gripping the rim at the joint to break or set said joint, each grip including a bearing, a fixed jaw on said bearing, a rod slidable in said bearing, a movable jaw on said rod, and a spring surrounding said rod for normally holding said movable jaw against the end of the bearing.

3. A tire changer including a base, standards upstanding from said base, a head secured to the upper ends of said standards, a screw journaled at its lower end in said base and at its upper end in said head, two nuts on said screw, arms pivoted at one end to one of said nuts, rim grips, each grip being pivoted to the other end of one of said arms, arms pivoted to the other nut at one end and at their other end to said grips respectively, ears on said nuts through which said standards extend, a frame, a bearing on said frame through which one of said rods extends, clamps on said frame which engage other standards, a lever pivoted to said frame, a link connected at one end to said lever, and a pair of jaws pivoted to the other end of said link for engaging the rim at the joint to break or make the joint as the lever is swung inwardly or outwardly.

In testimony whereof I affix my signature.

CHESTER ALVIN CLARK.